Aug. 13, 1935.  J. C. HOCHMAN  2,011,282
PROTRACTOR
Filed March 16, 1934
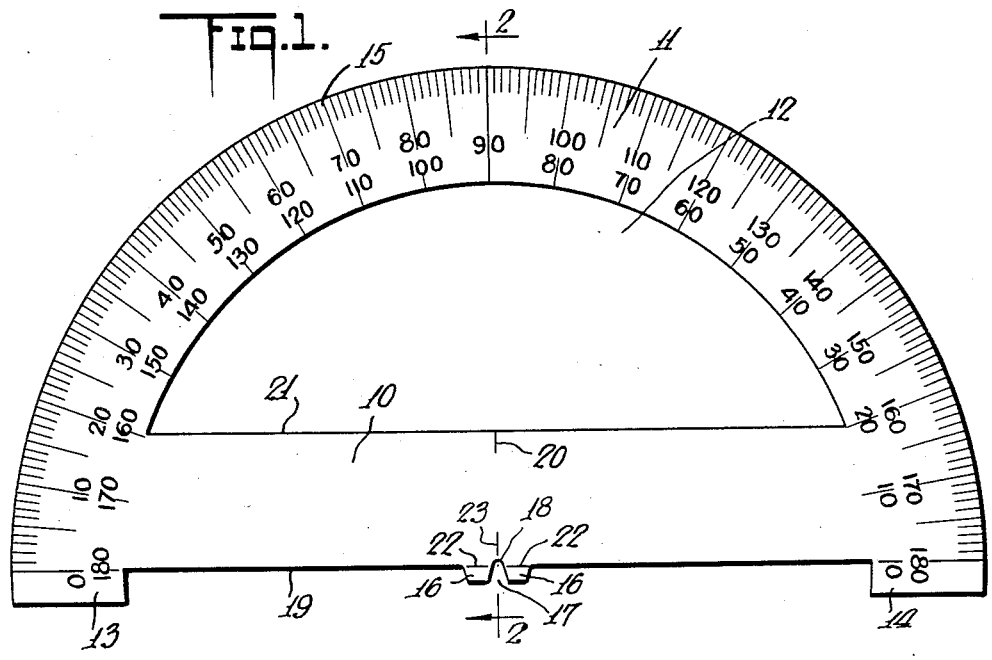
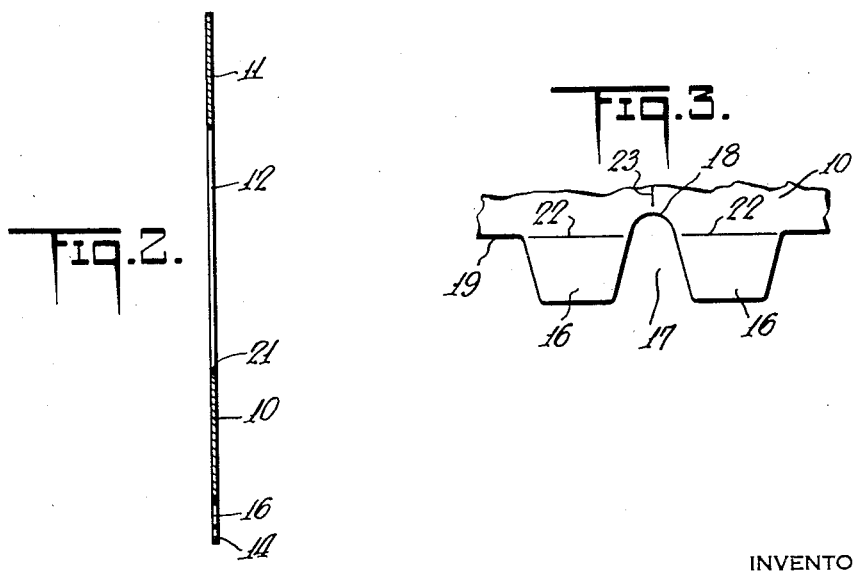
INVENTOR
Julius C. Hochman
BY
Dean, Fairbank, Hirsch & Foster
ATTORNEYS Patented Aug. 13, 1935

2,011,282

UNITED STATES PATENT OFFICE 2,011,282

PROTRACTOR

Julius C. Hochman, New York, N. Y., assignor to Eagle Pencil Company, New York, N. Y., a corporation of Delaware Application March 16, 1934, Serial No. 715,844

10 Claims. (Cl. 33—1)

My present invention relates primarily to protractors.

It is among the objects of the invention to provide a protractor which, while inexpensive in construction, has a degree of accuracy commensurate with that of precision instruments far more costly.

Another object is to provide a protractor of the above type which lends itself conveniently and expeditiously for accurate positioning and marking, and which is applicable even where the reference lines on the drawing are shorter than the radius of the protractor.

In the accompanying drawing in which is shown one of various possible embodiments of the several features of the invention:

Fig. 1 is a plan view of a preferred form of the invention,

Fig. 2 is a view thereof in transverse cross-section, and

Fig. 3 is a fragmentary detail on a greatly enlarged scale.

Referring now to the drawing, the protractor is shown as a unitary metal piece of brass, steel or the like of stock about .025 inches thick. According to the preferred mode of manufacture, various markings and numerals of the protractor are preferably applied simultaneously with the stamping operation. Alternatively, the protractor may be etched instead of stamped out of the metal blank.

The protractor includes a beam 10 and an arc 11 determining a segmental circular opening 12 therebetween. The arc has short extension feet 13 and 14 beyond the beam, which determine full graduation of the angular markings from zero to 180 degrees, so that the scale is as accurate at its extremities as it is between said extremities. The scale markings are conventional, preferably showing complementary numbers aggregating 180 degrees at each 10 degree radial mark 15.

Preferably the median part of the lower edge 19 of the beam 10 has a protuberance 16 bifurcated or notched as at 17 precisely at the middle of said beam to determine the center point of the protractor. As best indicated in Fig. 3, the notch 17 extends somewhat beyond the lower straight edge 19 of the beam, to make allowance for the thickness of the round pencil lead ordinarily used. Preferably the indentation 18 within, above, or beyond the straight lower edge 19 of the beam is semicircular and of diameter equal to that of the marking lead in the average pencil, thereby to bring the marking point substantially precisely in line with the lower edge of the beam, for convenient and accurate centering of the protractor.

The base of the protuberance has a horizontal line or scratch 22 on each wing thereof, aligned with the lower straight edge 19 of the beam, and a vertical line or scratch 23 immediately above the notch 17, 18. The upper edge 21 of the beam moreover has a vertical center line mark or scratch 20.

Preferably the protractor is highly polished, the depressed markings and numerals are filled in with black enamel and the whole protractor is lacquered to preserve its color.

In use of the apparatus, the pencil point would simply be placed at the center of the arc or angle to be determined, the notch 17 of the protractor would be readily advanced to embrace the pencil point, the lower edge 19 of the beam with the help of its center line 22 would readily be aligned with the base, abscissa or other reference line on the drawing and the angle mark would thus be conveniently and accurately made.

The protractor is not limited for application in cases where the horizontal and vertical reference lines on the drawing are of length greater than the radius of the protractor, but the guide edge of the protractor can be readily aligned with a very short base line and the center line 20 on the beam can be readily set with respect to a very short vertical reference line.

According to the present invention, the protractor has all of the advantages of a translucent composition protractor in affording facility of positioning without effectively destroying visibility, coupled with the advantages as to durability and low cost inherent in metal protractors.

The protractor is substantially as accurate as, and affords greater convenience of use than do more expensive precision instruments for this purpose. It lends itself especially for use by students, and for most practical purposes is adapted for use even by professional draftsmen.

Obviously the invention is not limited in its applicability to stamped metal protractors, but the feature especially of the centering notch construction has a wider field of application to protractors of other materials and to certain other drafting implements.

It will thus be seen that there is herein described an implement in which the several features of this invention are embodied, and which attains the various objects of the invention and is well suited to meet the requirements of practical use.

As many changes could be made in the above construction, and many apparently widely different embodiments of this invention could be made without departing from the scope thereof, it is intended that all matter contained in the above description or shown in the accompanying drawing shall be interpreted as illustrative and not in a limiting sense.

Having thus described my invention, what I claim as new and desire to secure by Letters Patent is:

1. A protractor having a beam and an arc having its ends extending beyond the beam and affording full 180° graduation, the beam having a central positioning notch effectively alined with the lower beam edge, the upper beam edge presenting a centering line.

2. A protractor of a unitary stamping comprising a beam and an arc, the latter having its ends extending beyond the lower edge of the beam, thereby to afford full 180° graduation, the beam having a central notch of width to accommodate a pencil point in alignment with the lower edge of the beam, the upper edge of the beam presenting a center line.

3. A protractor including a unitary stamping comprising a beam and an arc, the extremities of the latter extending slightly beyond the former to afford full 180° graduation, the beam having a median protuberance notched to beyond the lower straight edge of the beam for accommodating the writing point of a pencil in alignment with said lower edge.

4. A protractor including a unitary stamping comprising a beam and an arc, the extremities of the latter extending slightly beyond the former to afford full 180° graduation, the beam having a median protuberance notched to beyond the lower straight edge of the beam for accommodating the writing point of a pencil in alignment with said lower edge, the upper edge of the beam presenting a center line.

5. A protractor including a beam, the lower edge of said beam having a median protuberance with a notch extending beyond the lower straight base edge of the protractor to position a pencil point substantially in alinement with said lower edge.

6. A protractor comprising a unitary stamping including a beam and an arc, the extremities of the latter extending somewhat beyond the beam for full 180° graduation, the beam presenting a median protuberance having a notch extending slightly beyond the lower straight edge of the beam to accommodate a pencil point in substantial alignment with said lower edge, the upper edge of the beam also presenting a center line.

7. A protractor including a beam and an arc, the beam presenting a medium protuberance having a central notch extending beyond the straight edge of the beam in a semi-circular contour, of diameter substantially that of the pencil lead to be used with the protractor.

8. A protractor comprising a unitary stamping including a beam and an arc, the extremities of the latter extending somewhat beyond the beam for full 180° graduation, the beam presenting a median protuberance having a notch extending slightly beyond the lower straight edge of the beam, to accommodate a pencil point in substantial alignment with said lower edge, the protuberance presenting a horizontal centering line which is a continuation of said lower straight edge and the upper edge of the beam presenting a vertical center line.

9. An implement of the character described including a flat rigid member presenting a straight edge having a protuberance, said protuberance centrally notched to beyond the straight edge, said protuberance having a center line along said straight edge.

10. An implement of the character described including a flat rigid member presenting a straight edge having a protuberance, said protuberance centrally notched to beyond the straight edge, said protuberance having a center line along said straight edge, the portion of the notch extending beyond the straight edge having a semi-circular contour of diameter substantially that of the pencil point to be used with the implement.

JULIUS C. HOCHMAN.